United States Patent
Tang et al.

(10) Patent No.: US 11,711,708 B2
(45) Date of Patent: Jul. 25, 2023

(54) COMMUNICATION METHOD AND COMMUNICATIONS APPARATUS

(71) Applicant: Huawei Technologies Co., Ltd., Shenzhen (CN)

(72) Inventors: Xun Tang, Beijing (CN); Li Chai, Shenzhen (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/991,560

(22) Filed: Aug. 12, 2020

(65) Prior Publication Data
US 2020/0374734 A1    Nov. 26, 2020

Related U.S. Application Data

(63) Continuation of application No. PCT/CN2018/076757, filed on Feb. 13, 2018.

(51) Int. Cl.
| | |
|---|---|
| *H04W 24/10* | (2009.01) |
| *H04W 68/00* | (2009.01) |
| *H04W 72/0446* | (2023.01) |
| *H04W 72/0453* | (2023.01) |
| *H04W 72/56* | (2023.01) |

(52) U.S. Cl.
CPC ......... *H04W 24/10* (2013.01); *H04W 68/005* (2013.01); *H04W 72/0446* (2013.01); *H04W 72/0453* (2013.01); *H04W 72/56* (2023.01)

(58) Field of Classification Search
None
See application file for complete search history.

(56) References Cited

U.S. PATENT DOCUMENTS

| | | | | |
|---|---|---|---|---|
| 5,768,688 | A * | 6/1998 | Owada | H04B 17/20 |
| | | | | 455/67.11 |
| 2010/0267378 | A1* | 10/2010 | Hamabe | H04W 36/305 |
| | | | | 455/423 |
| 2013/0005356 | A1* | 1/2013 | Kobayashi | H04W 64/003 |
| | | | | 455/456.1 |

(Continued)

FOREIGN PATENT DOCUMENTS

| | | | |
|---|---|---|---|
| CN | 101605352 A | 12/2009 | |
| CN | 101790200 A | 7/2010 | |

(Continued)

OTHER PUBLICATIONS

LG Electronics Inc., "Idle measurement enhancement using UE speed", 3GPP TSG-RAN WG2 Meeting NR AH#2, R2-1706933, Jun. 27-29, 2017, 3 pages, Tsingdao, China.

(Continued)

*Primary Examiner* — Chi H Pham
*Assistant Examiner* — Raul Rivas
(74) *Attorney, Agent, or Firm* — Slater Matsil, LLP

(57) ABSTRACT

A communication method and a communications apparatus are disclosed to provide an implementation solution for measuring, in an idle state, a carrier. The method includes: initiating, in an idle state, measurement on one or more carriers when a volume of to-be-sent data exceeds a first threshold, or initiating measurement on one or more carriers when a paging message is received; and sending an obtained measurement result to a network device.

15 Claims, 7 Drawing Sheets

(56) References Cited

U.S. PATENT DOCUMENTS

| | | | |
|---|---|---|---|
| 2014/0022978 A1* | 1/2014 | Chen | H04W 76/27 370/312 |
| 2014/0029514 A1 | 1/2014 | Yu et al. | |
| 2015/0029955 A1 | 1/2015 | Hyoung et al. | |
| 2015/0117284 A1 | 4/2015 | Baldemair et al. | |
| 2016/0269260 A1* | 9/2016 | Kazmi | H04W 72/085 |
| 2016/0316466 A1 | 10/2016 | Liu et al. | |
| 2017/0156176 A1 | 6/2017 | Bergquist et al. | |
| 2017/0339714 A1* | 11/2017 | Harada | H04W 72/1289 |
| 2018/0007731 A1 | 1/2018 | Park et al. | |
| 2018/0288755 A1 | 10/2018 | Liu et al. | |
| 2018/0332659 A1 | 11/2018 | Hwang et al. | |
| 2020/0336227 A1 | 10/2020 | Takeda et al. | |
| 2021/0051536 A1* | 2/2021 | Yang | H04W 36/0058 |

FOREIGN PATENT DOCUMENTS

| | | |
|---|---|---|
| CN | 103581918 A | 2/2014 |
| CN | 104144437 A | 11/2014 |
| CN | 104811929 A | 7/2015 |
| CN | 105247941 A | 1/2016 |
| CN | 106160980 A | 11/2016 |
| CN | 107040956 A | 8/2017 |
| CN | 107148791 A | 9/2017 |
| CN | 107426764 A | 12/2017 |
| CN | 107534538 A | 1/2018 |
| WO | 2015152554 A1 | 10/2015 |
| WO | 2016149167 A1 | 9/2016 |
| WO | 2017034230 A1 | 3/2017 |
| WO | 2017041274 A1 | 3/2017 |
| WO | 2019056906 A1 | 3/2019 |

OTHER PUBLICATIONS

Nokia, "Direct activation of configured Scells", 3GPP TSG-RAN WG2 #99bis, R2-1713164, Nov. 27-Dec. 1, 2017, 6 pages, Reno, Nevada, USA.

3GPP TS 36.321 V15.0.0 (Dec. 2017), 3rd Generation Partnership Project; Technical Specification Group Radio Access Network; Evolved Universal Terrestrial Radio Access (E-UTRA); Medium Access Control (MAC) protocol specification KRelease 15), total 109 pages.

3GPP TS 36.331 V15.0.1 (Jan. 2018), 3rd Generation Partnership Project; Technical Specification Group Radio Access Network; Evolved Universal Terrestrial Radio Access (E-UTRA); Radio Resource Control (RRC); Protocol specification (Release 15), total 776 pages.

Ericsson, "Measurement configurations and signaling for fast setup", 3GPP TSG-RAN WG2 NR#2, Tdoc R2-1707237, Jun. 27-29, 2017, 3 pages, Qingdao, China.

* cited by examiner

COMMUNICATION METHOD AND COMMUNICATIONS APPARATUS

CROSS-REFERENCE TO RELATED APPLICATIONS

This application is a continuation of International Application No. PCT/CN2018/076757, filed on Feb. 13, 2018, the disclosure of which is hereby incorporated by reference in its entirety.

TECHNICAL FIELD

Embodiments of this application relate to the field of communications technologies, and in particular, to a communication method and a communications apparatus.

BACKGROUND

In a conventional cellular wireless communications system, a terminal can perform data receiving and sending in only one cell at a same moment. To provide a higher transmission rate for the terminal, a carrier aggregation (CA) technology is introduced into the wireless communications system. The CA technology ensures that the terminal can simultaneously transmit data on a plurality of carriers, thereby improving a data transmission rate. The plurality of carriers usually include one primary component carrier and one or more secondary component carriers. A cell working on the primary component carrier is a primary cell (PCell), the PCell is a cell that the terminal initially accesses, and a base station that serves the PCell is responsible for performing radio resource control (RRC) communication with the terminal. A cell working on a secondary component carrier is a secondary cell (SCell), and the SCell may provide an additional radio resource for the terminal.

The base station performs, on the primary component carrier, measurement configuration on the terminal, and the terminal measures another carrier based on information about the measurement configuration. After completing the measurement, the terminal feeds back a measurement report to the base station. After receiving the measurement report, the base station sends an RRC reconfiguration message to the terminal, and configures the secondary cell for the terminal by using the RRC reconfiguration message. An initial state of the secondary cell configured by the base station for the terminal is usually an inactive state. Then, the base station sends an activation command to the terminal, and the terminal completes activation of the secondary cell based on the activation command. After the activation of the secondary cell is completed, the base station and the terminal may transmit data by using the secondary cell in an active state.

It can be learned that a process of configuring and activating the secondary cell takes a long time. Consequently, efficiency of transmitting data by using the carrier aggregation technology is reduced.

SUMMARY

Embodiments of this application provide a communication method and a communications apparatus, to provide an implementation solution of measuring, in an idle state, a carrier, to enhance application performance of a carrier aggregation technology.

Specific technical solutions provided in the embodiments of this application are as follows.

According to a first aspect, a communication method is provided. The method includes the following steps: When a terminal is in an RRC idle state and meets a measurement starting condition, the terminal initiates measurement on one or more carriers, where the measurement starting condition may be that a volume of to-be-sent data exceeds a first threshold, or a paging message is received. The terminal sends an obtained measurement result to a network device. The terminal measures, in the idle state, the carriers, and can report the measurement result after obtaining an uplink resource. This helps implement quick reporting of the measurement result, thereby shortening a delay in configuring a secondary cell, improving utilization of the carrier aggregation technology, and further improving efficiency of system data transmission. By setting the measurement starting condition, a specific implementation solution of measuring, in the idle state, the carriers is provided. The measurement in the idle state is started by setting the first threshold or by using the paging message, so as to avoid long-time continuous measurement performed by the terminal, thereby helping reduce energy consumption of the terminal.

In a possible design, the paging message carries information used to indicate the terminal to start to measure the one or more carriers. When receiving the paging message, the terminal initiates the measurement on the one or more carriers based on the information carried in the paging message. In a manner of adding an indication to the existing paging message, measurement information may be separately configured for each terminal. Optionally, the paging message may be designed by using an existing IE. The paging message designed by using the existing IE is used to indicate the terminal to start to measure the one or more carriers. Once receiving the paging message, the terminal initiates the measurement on the one or more carriers. A manner of multiplexing the paging message can reduce signaling overheads.

In a possible design, the one or more carriers may be measured in any one of the following manners. For example, the one or more carriers are measured based on first measurement duration. Optionally, the first measurement duration herein may be notified by the network device, or may be specified in a protocol. For another example, the one or more carriers are measured based on second measurement duration determined based on a speed or the height of the terminal, where the speed or the height is a state of the terminal, and the speed or the height herein may be alternatively replaced with another state of the terminal. Different states of the terminal indicate different measurement duration. For still another example, the one or more carriers are measured in a periodic measurement manner. For yet another example, the one or more carriers are measured for one time to obtain a first measurement value. If a distance between a current location of the terminal and a location at which the terminal performs the measurement is greater than a second threshold, the one or more carriers are measured for another time to obtain a second measurement value, and the measurement result is determined based on the second measurement value: The second measurement value covering the first measurement value may be directly used as the measurement result; or after a specific operation is performed based on the second measurement value and the first measurement value, an obtained operation result is used as the measurement result. The manner avoids a case in which a latest measurement result cannot reflect a channel state of the current location of the terminal due to movement of the terminal, and improves accuracy and reliability of the measurement result of the carriers. By designing the foregoing several measurement manners, a specific design solution of measuring, in the idle state, duration of the carriers is provided.

In a possible design, the one or more carriers are measured in the periodic measurement manner, specifically, the one or more carriers are measured in the periodic measurement manner based on at least two of cycle duration, a measurement time length, and an interval time length. The cycle duration is a sum of the measurement time length and the interval time length. A time part corresponding to the measurement time length is used to measure the carriers, and the measurement performed on the carriers is stopped (in other words, the carriers are not measured) in a time part corresponding to the interval time length. The manner is a new manner of measuring, in the idle state, the carriers provided in this application. The periodic measurement manner helps ensure effectiveness and reliability of the measurement result, and can further reduce the energy consumption of the terminal.

In a possible design, the second measurement duration is determined based on a first adjustment factor and the first measurement duration, and the first adjustment factor corresponds to the height of the terminal. The first adjustment factor may be determined based on the height of the terminal, and the second measurement duration may be determined based on the first adjustment factor and the first measurement duration. Alternatively, the second measurement duration is determined based on a second adjustment factor and the first measurement duration, and the second adjustment factor corresponds to the speed of the terminal. The second adjustment factor is determined based on the speed of the terminal, and the second measurement duration is determined based on the second adjustment factor and the first measurement duration. The second measurement duration is adjusted based on the height or the speed of the terminal, and the measurement duration may be dynamically adjusted based on the state of the terminal. For example, the first adjustment factor or the second adjustment factor may be calculated, so that a larger value of the speed or the height of the terminal indicates a larger value of the second measurement duration, and relatively long carrier measurement duration can be obtained at a high speed or at a high altitude, so that the measurement result is more accurate and reliable.

In a possible design, a measurement manner sent by the network device or a measurement manner specified in a protocol is received, where the measurement manner includes the first measurement duration, and the measurement manner may further include a first group of adjustment factors and a first correspondence between each adjustment factor in the first group of adjustment factors and a height range, or a second group of adjustment factors and a second correspondence between each adjustment factor in the second group of adjustment factors and a speed range. The first adjustment factor corresponding to the height range to which the current height belongs is determined based on the first correspondence, and the second measurement duration is determined based on the first measurement duration and the first adjustment factor. Alternatively, the second adjustment factor corresponding to the speed range to which the current speed belongs is determined based on the second correspondence, and the second measurement duration is determined based on the first measurement duration and the second adjustment factor. Optionally, first sub-duration may be further determined based on the first correspondence and the current height, second sub-duration is determined based on the second correspondence and the current speed, and the second measurement duration is determined based on the first sub-duration and the second sub-duration. The second measurement duration is adjusted based on the height or the speed of the terminal, and the measurement duration may be dynamically adjusted based on the state of the terminal. For example, the first adjustment factor or the second adjustment factor may be calculated, so that a larger value of the speed or the height of the terminal indicates a larger value of the second measurement duration, and relatively long carrier measurement duration can be obtained at a high speed or at a high altitude, so that the measurement result is more accurate and reliable.

In a possible design, the measurement manner may further include a first group of measurement duration and a third correspondence between each measurement duration in the first group of measurement duration and a height range, or the measurement manner includes a second group of measurement duration and a fourth correspondence between each measurement duration in the second group of measurement duration and a speed range. The terminal determines, based on the third correspondence, duration that is in the first group of measurement duration and that has a correspondence with the height range to which the current height belongs, as the second measurement duration. Alternatively, the terminal determines, based on the fourth correspondence, duration that is in the second group of measurement duration and that has a correspondence with the speed range to which the current speed belongs, as the second measurement duration. The second measurement duration is adjusted based on the height or the speed of the terminal, and the measurement duration may be dynamically adjusted based on the state of the terminal. For example, the first adjustment factor or the second adjustment factor may be calculated, so that a larger value of the speed or the height of the terminal indicates a larger value of the second measurement duration, and relatively long carrier measurement duration can be obtained at a high speed or at a high altitude, so that the measurement result is more accurate and reliable.

In a possible design, priorities that are of the carriers and that are sent by the network device may be further received, and the one or more carriers are determined as to-be-measured carriers based on the priorities of the carriers. Usually, one or more carriers with relatively high priorities may be selected for measurement. In this way, measurement consumption of the terminal may be reduced, and electric energy of the terminal may be saved.

In a possible design, measurement duration of each carrier may be further determined based on a priority of the carrier. For example, for a carrier with a relatively high priority, measurement duration is relatively long; for a carrier with a relatively low priority, measurement duration is relatively short. There is a relatively high probability that the carrier with the relatively high priority is configured as a secondary cell by the network device. According to the foregoing design, a measurement result of the carrier that is more likely to be configured as the secondary cell may be more accurate and reliable.

According to a second aspect, a communication method is provided. The communication method includes: sending a first threshold or a paging message to a terminal, where the paging message is used to indicate the terminal to initiate, in an idle state, measurement on one or more carriers; and receiving a measurement result sent by the terminal, where the first threshold is used to indicate the terminal to initiate, in the idle state, the measurement on the one or more carriers when a volume of to-be-sent data exceeds the first threshold. The terminal measures, in the idle state, the carriers, and can report the measurement result after obtaining an uplink resource. This helps implement quick reporting of the measurement result, thereby shortening a delay in configuring a secondary cell, improving utilization of a carrier aggregation technology, and further improving efficiency of system data transmission. The measurement in the idle state is started by setting the first threshold or by using the paging message, so as to avoid long-time continuous measurement performed by the terminal, thereby helping reduce energy consumption of the terminal.

In a possible design, the paging message carries indication information, and the indication information is used to indicate the terminal to start to measure the one or more carriers. In this way, when receiving the paging message, the terminal initiates the measurement on the one or more carriers based on the information carried in the paging message. In a manner of adding an indication to the existing paging message, measurement information may be separately configured for each terminal. Optionally, the paging message may be designed by using an existing IE. The paging message designed by using the existing IE is used to indicate the terminal to start to measure the one or more carriers. Once receiving the paging message, the terminal initiates the measurement on the one or more carriers. A manner of multiplexing the paging message can reduce signaling overheads.

In a possible design, a measurement manner is further sent to the terminal, where the measurement manner is a manner used to indicate the terminal to measure, in the idle state, the one or more carriers, and the measurement result sent by the terminal is received. A manner of indicating, by using the measurement manner, the terminal to measure, in the idle state, a secondary component carrier helps improve utilization of a carrier aggregation technology.

In a possible design, the measurement manner includes: first measurement duration, or a manner of determining second measurement duration based on first measurement duration and a height of the terminal, or a manner of determining second measurement duration based on first measurement duration and a speed of the terminal, or a periodic measurement manner, or a manner of performing measurement for another time when a movement distance after measurement is performed for one time exceeds a threshold. According to the foregoing design of the second measurement duration, the measurement duration may be dynamically adjusted based on a state of the terminal. For example, the second measurement duration may be calculated, so that a larger value of the speed or the height of the terminal indicates a larger value of the second measurement duration, and relatively long carrier measurement duration can be obtained at a high speed or at a high altitude, so that the measurement result is more accurate and reliable.

In a possible design, at least two of cycle duration, a measurement time length, and an interval time length may be sent to the terminal; or the first measurement duration, a first adjustment factor corresponding to the height of the terminal, or a second adjustment factor corresponding to the speed of the terminal is sent to the terminal, where the first adjustment factor is used to determine the second measurement duration in combination with the first measurement duration, or the second adjustment factor is used to determine the second measurement duration in combination with the first measurement duration; or the threshold is sent to the terminal, where the threshold is used to indicate the terminal to perform measurement for another time when a movement distance after measurement is performed for one time exceeds the threshold. By sending the foregoing several measurement manners, a specific design solution of measuring, in the idle state, duration of the carriers is provided. The second measurement duration is adjusted based on the height or the speed of the terminal, and the measurement duration may be dynamically adjusted based on the state of the terminal. For example, the first adjustment factor or the second adjustment factor may be calculated, so that a larger value of the speed or the height of the terminal indicates a larger value of the second measurement duration, and relatively long carrier measurement duration can be obtained at a high speed or at a high altitude, so that the measurement result is more accurate and reliable.

According to a third aspect, a communication method is provided. When a terminal is in an RRC idle state, the terminal measures one or more carriers, and sends, on an uplink resource, an obtained measurement result to a network device. Specifically, the one or more carriers may be measured in any one of the following manners. For example, the one or more carriers are measured based on first measurement duration. Optionally, the first measurement duration herein may be notified by the network device, or may be specified in a protocol. For another example, the one or more carriers are measured based on second measurement duration determined based on a speed or the height of the terminal, where the speed or the height is a state of the terminal, and the speed or the height herein may be alternatively replaced with another state of the terminal. Different states of the terminal indicate different measurement duration. For still another example, the one or more carriers are measured in a periodic measurement manner. For yet another example, the one or more carriers are measured for one time to obtain a first measurement value. If a distance between a current location of the terminal and a location at which the terminal performs the measurement is greater than a second threshold, the one or more carriers are measured for another time to obtain a second measurement value, and the measurement result is determined based on the second measurement value: The second measurement value covering the first measurement value may be directly used as the measurement result; or after a specific operation is performed based on the second measurement value and the first measurement value, an obtained operation result is used as the measurement result. The manner avoids a case in which a latest measurement result cannot reflect a channel state of the current location of the terminal due to movement of the terminal, and improves accuracy and reliability of the measurement result of the carriers. By designing the foregoing several measurement manners, a specific design solution of measuring, in the idle state, duration of the carriers is provided.

In a possible design, the one or more carriers are measured in the periodic measurement manner, specifically, the one or more carriers are measured in the periodic measurement manner based on at least two of cycle duration, a measurement time length, and an interval time length. The cycle duration is a sum of the measurement time length and the interval time length. A time part corresponding to the measurement time length is used to measure the carriers, and the measurement performed on the carriers is stopped (in other words, the carriers are not measured) in a time part corresponding to the interval time length. The manner is a new manner of measuring, in the idle state, the carriers provided in this application. The periodic measurement manner helps ensure effectiveness and reliability of the measurement result, and can further reduce energy consumption of the terminal.

In a possible design, the second measurement duration is determined based on a first adjustment factor and the first measurement duration, and the first adjustment factor corresponds to the height of the terminal. The first adjustment factor may be determined based on the height of the terminal, and the second measurement duration may be determined based on the first adjustment factor and the first measurement duration. Alternatively, the second measurement duration is determined based on a second adjustment factor and the first measurement duration, and the second adjustment factor corresponds to the speed of the terminal. The second adjustment factor is determined based on the speed of the terminal, and the second measurement duration is determined based on the second adjustment factor and the first measurement duration. The second measurement duration is adjusted based on the height or the speed of the terminal, and the measurement duration may be dynamically adjusted based on the state of the terminal. For example, the first adjustment factor or the second adjustment factor may be calculated, so that a larger value of the speed or the height of the terminal indicates a larger value of the second measurement duration, and relatively long carrier measurement duration can be obtained at a high speed or at a high altitude, so that the measurement result is more accurate and reliable.

In a possible design, a measurement manner sent by the network device or a measurement manner specified in a protocol is received, where the measurement manner includes the first measurement duration, and the measurement manner may further include a first group of adjustment factors and a first correspondence between each adjustment factor in the first group of adjustment factors and a height range, or a second group of adjustment factors and a second correspondence between each adjustment factor in the second group of adjustment factors and a speed range. The first adjustment factor corresponding to the height range to which the current height belongs is determined based on the first correspondence, and the second measurement duration is determined based on the first measurement duration and the first adjustment factor. Alternatively, the second adjustment factor corresponding to the speed range to which the current speed belongs is determined based on the second correspondence, and the second measurement duration is determined based on the first measurement duration and the second adjustment factor. Optionally, first sub-duration may be further determined based on the first correspondence and the current height, second sub-duration is determined based on the second correspondence and the current speed, and the second measurement duration is determined based on the first sub-duration and the second sub-duration. The second measurement duration is adjusted based on the height or the speed of the terminal, and the measurement duration may be dynamically adjusted based on the state of the terminal. For example, the first adjustment factor or the second adjustment factor may be calculated, so that a larger value of the speed or the height of the terminal indicates a larger value of the second measurement duration, and relatively long carrier measurement duration can be obtained at a high speed or at a high altitude, so that the measurement result is more accurate and reliable.

In a possible design, the measurement manner may further include a first group of measurement duration and a third correspondence between each measurement duration in the first group of measurement duration and a height range, or the measurement manner includes a second group of measurement duration and a fourth correspondence between each measurement duration in the second group of measurement duration and a speed range. The terminal determines, based on the third correspondence, duration that is in the first group of measurement duration and that has a correspondence with the height range to which the current height belongs, as the second measurement duration. Alternatively, the terminal determines, based on the fourth correspondence, duration that is in the second group of measurement duration and that has a correspondence with the speed range to which the current speed belongs, as the second measurement duration. The second measurement duration is adjusted based on the height or the speed of the terminal, and the measurement duration may be dynamically adjusted based on the state of the terminal. For example, the first adjustment factor or the second adjustment factor may be calculated, so that a larger value of the speed or the height of the terminal indicates a larger value of the second measurement duration, and relatively long carrier measurement duration can be obtained at a high speed or at a high altitude, so that the measurement result is more accurate and reliable.

In a possible design, priorities that are of the carriers and that are sent by the network device may be further received, and the one or more carriers are determined as to-be-measured carriers based on the priorities of the carriers. Usually, one or more carriers with relatively high priorities may be selected for measurement. In this way, measurement consumption of the terminal may be reduced, and electric energy of the terminal may be saved.

In a possible design, measurement duration of each carrier may be further determined based on a priority of the carrier. For example, for a carrier with a relatively high priority, measurement duration is relatively long; for a carrier with a relatively low priority, measurement duration is relatively short. There is a relatively high probability that the carrier with the relatively high priority is configured as a secondary cell by the network device. According to the foregoing design, a measurement result of the carrier that is more likely to be configured as the secondary cell may be more accurate and reliable.

According to a fourth aspect, a communication method is provided. The communication method includes: sending a measurement manner to a terminal, where the measurement manner is a manner used to indicate the terminal to measure, in an idle state, one or more carriers; and receiving a measurement result sent by the terminal. The terminal measures, in the idle state, the carriers, and can report the measurement result after obtaining an uplink resource. This helps implement quick reporting of the measurement result, thereby shortening a delay in configuring a secondary cell, improving utilization of a carrier aggregation technology, and further improving efficiency of system data transmission.

In a possible design, the measurement manner includes: first measurement duration, or a manner of determining second measurement duration based on first measurement duration and a height of the terminal, or a manner of determining second measurement duration based on first measurement duration and a speed of the terminal, or a periodic measurement manner, or a manner of performing measurement for another time when a movement distance after measurement is performed for one time exceeds a threshold. According to the foregoing design of the second measurement duration, the measurement duration may be dynamically adjusted based on a state of the terminal. For example, the second measurement duration may be calculated, so that a larger value of the speed or the height of the terminal indicates a larger value of the second measurement duration, and relatively long carrier measurement duration can be obtained at a high speed or at a high altitude, so that the measurement result is more accurate and reliable.

In a possible design, at least two of cycle duration, a measurement time length, and an interval time length may be sent to the terminal; or the first measurement duration, a first adjustment factor corresponding to the height of the terminal, or a second adjustment factor corresponding to the speed of the terminal is sent to the terminal, where the first adjustment factor is used to determine the second measurement duration in combination with the first measurement duration, or the second adjustment factor is used to determine the second measurement duration in combination with the first measurement duration; or the threshold is sent to the terminal, where the threshold is used to indicate the terminal to perform measurement for another time when a movement distance after measurement is performed for one time exceeds the threshold. By sending the foregoing several measurement manners, a specific design solution of measuring, in the idle state, duration of the carriers is provided. The second measurement duration is adjusted based on the height or the speed of the terminal, and the measurement duration may be dynamically adjusted based on the state of the terminal. For example, the first adjustment factor or the second adjustment factor may be calculated, so that a larger value of the speed or the height of the terminal indicates a larger value of the second measurement duration, and relatively long carrier measurement duration can be obtained at a high speed or at a high altitude, so that the measurement result is more accurate and reliable.

According to a fifth aspect, a communications apparatus is provided. The apparatus has a function of implementing the foregoing first aspect and any one of possible designs of the first aspect. The function may be implemented by hardware, or may be implemented by hardware by executing corresponding software. The hardware or the software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to the foregoing first aspect and any one of possible designs of the first aspect.

In a possible design, the apparatus further includes a transceiver, configured for communication between the apparatus and a network device.

In a possible design, the apparatus is a terminal.

According to a sixth aspect, a communications apparatus is provided. The apparatus has a function of implementing the foregoing second aspect and any one of possible designs of the second aspect. The function may be implemented by hardware, or may be implemented by hardware by executing corresponding software. The hardware or the software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to the foregoing second aspect and any one of possible designs of the second aspect.

In a possible design, the apparatus further includes a transceiver, configured for communication between the apparatus and a network device.

In a possible design, the apparatus is the network device.

According to a seventh aspect, a communications apparatus is provided. The apparatus has a function of implementing the foregoing third aspect and any one of possible designs of the third aspect. The function may be implemented by hardware, or may be implemented by hardware by executing corresponding software. The hardware or the software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to the foregoing third aspect and any one of possible designs of the third aspect.

In a possible design, the apparatus further includes a transceiver, configured for communication between the apparatus and a network device.

In a possible design, the apparatus is a terminal.

According to an eighth aspect, a communications apparatus is provided. The apparatus has a function of implementing the foregoing fourth aspect and any one of possible designs of the fourth aspect. The function may be implemented by hardware, or may be implemented by hardware by executing corresponding software. The hardware or the software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to the foregoing fourth aspect and any one of possible designs of the fourth aspect.

In a possible design, the apparatus further includes a transceiver, configured for communication between the apparatus and a network device.

In a possible design, the apparatus is the network device.

According to a ninth aspect, a chip is provided. The chip is connected to a memory or the chip includes the memory, and is configured to read and execute a software program stored in the memory, to implement the method according to the foregoing first aspect and any one of possible designs of the first aspect.

According to a tenth aspect, a chip is provided. The chip is connected to a memory or the chip includes the memory, and is configured to read and execute a software program stored in the memory, to implement the method according to the foregoing second aspect and any one of possible designs of the second aspect.

According to an eleventh aspect, a chip is provided. The chip is connected to a memory or the chip includes the memory, and is configured to read and execute a software program stored in the memory, to implement the method according to the foregoing third aspect and any one of possible designs of the third aspect.

According to a twelfth aspect, a chip is provided. The chip is connected to a memory or the chip includes the memory, and is configured to read and execute a software program stored in the memory, to implement the method according to the foregoing fourth aspect and any one of possible designs of the fourth aspect.

According to a thirteenth aspect, a communications system is provided. The communications system includes the apparatus according to the fifth aspect or the seventh aspect, and further includes the apparatus according to the sixth aspect or the eighth aspect.

According to a fourteenth aspect, a computer storage medium is provided. The computer storage medium stores a computer program, and the computer program includes an instruction used to perform the method according to the foregoing aspects and any one of possible designs of the aspects.

According to a fifteenth aspect, a computer program product including an instruction is provided. When the computer program product runs on a computer, the computer is enabled to perform the method according to the foregoing aspects and any one of possible designs of the aspects.

DETAILED DESCRIPTION OF ILLUSTRATIVE EMBODIMENTS

Figure 1:
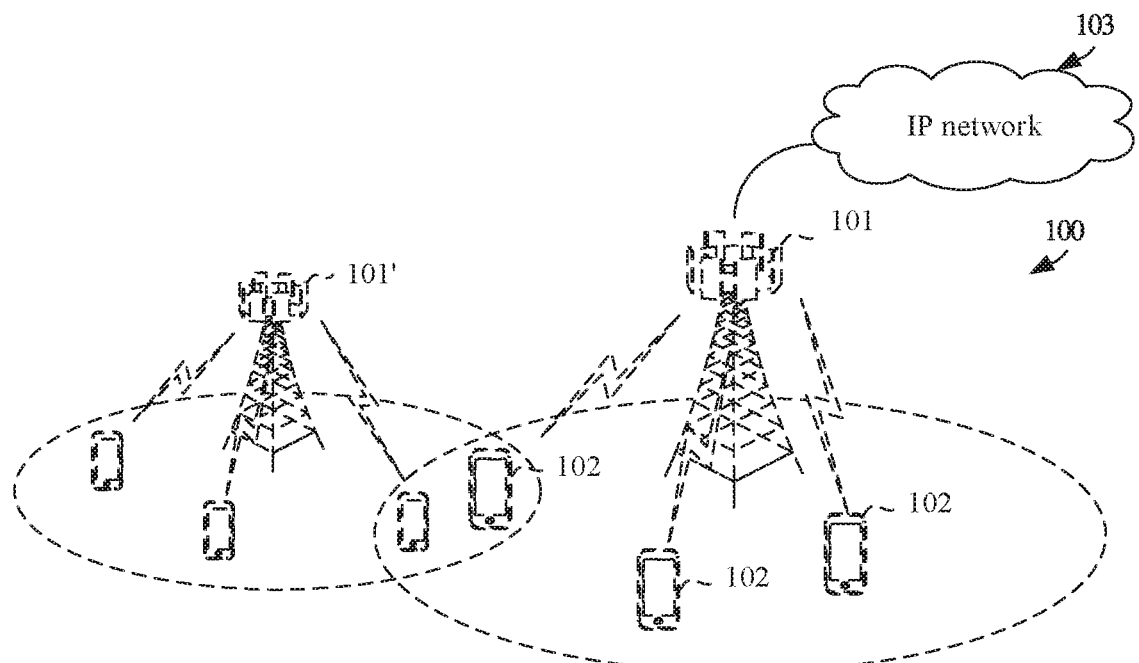
FIG. 1 is a schematic architectural diagram of a communications system according to an embodiment of this application.

This application provides a communication method and a communications apparatus. When a terminal is in an idle state and meets a measurement start condition, the terminal initiates measurement on one or more carriers, and stores a measurement result. The terminal sends, on a corresponding uplink resource, the measurement result to a network device. The network device can configure and activate a secondary cell only after receiving the measurement result. The terminal measures, in the idle state, the one or more carriers, and can report the measurement result after obtaining the uplink resource. This helps implement quick reporting of the measurement result, thereby shortening a delay in configuring the secondary cell, improving utilization of a carrier aggregation technology, and further improving efficiency of system data transmission. The method and the device are based on a same inventive concept. Because problem resolving principles of the method and the device are similar, for implementation of the device and the method, mutual reference may be made. Details are not repeatedly described.

Some terms used in embodiments of this application and basic knowledge of carrier aggregation are first explained and described, to facilitate understanding for persons skilled in the art.

(1) Carrier Aggregation

Carrier aggregation ensures that a network device configures a plurality of carriers for one terminal, and the terminal and the network device jointly transmit data by using the plurality of carriers. The plurality of carriers usually include one primary component carrier (PCC) and one or more secondary component carriers (SCC). A cell working on the primary component carrier is a primary cell (PCell), the PCell is a cell that the terminal initially accesses, and a base station that serves the PCell is responsible for performing radio resource control (RRC) communication with the terminal. A cell working on a secondary component carrier is a secondary cell (SCell), and the SCell may provide an additional radio resource for the terminal. The PCC is always activated, and the SCC may be activated by using the PCC or an activated SCC. An initial state of the SCC configured by the network device for the terminal is an inactive state.

If the terminal exchanges data with the network device on the primary component carrier, the terminal exchanges data with the network device in the primary cell. If the terminal exchanges data with the network device on the secondary component carrier, the terminal exchanges data with the network device in the secondary cell.

(2) Idle State and Connected State

RRC states include an idle state and a connected state. The idle state is an RRC_Idle state, and the connected state is an RRC_Connected state. When there is an RRC connection between the terminal and the network, the terminal is in the connected state; when there is no RRC connection between the terminal and the network, the terminal is in the idle state. The terminal in the idle state may perform the following operations: listening to system information, listening to a paging message, and the like. With evolution of a long term evolution (LTE) system and a design of a 5th generation (5G) system/new radio (NR) system, more RRC states are introduced, for example, a suspend state (which belongs to the idle state) in the LTE and an inactive state (which belongs to the connected state) in the NR. The design in this application is also applicable to the foregoing two states. In the description of the subsequent embodiments, the idle state also includes the suspend state and the inactive state.

(3) Relationship Between a Carrier and a Cell

An indication manner of a carrier usually includes frequency information and bandwidth information. The terminal can obtain a plurality of different cells through detection on a carrier corresponding to the terminal, and the cells have different physical cell IDs. The network device sends measurement configuration information (or configuration information) to the terminal, where the measurement configuration information includes one or more carriers that need to be measured by the terminal. The terminal receives the measurement configuration information, and measures the one or more carriers included in the measurement configuration information. The terminal feeds back a measurement result of the one or more carriers to the base station. For example, a measurement result of any carrier may be a physical cell ID detected by the terminal on the carrier and signal strength or quality information of each cell. The network device configures the secondary cell for the terminal based on the measurement result reported by the terminal, and indicates, in configuration information for configuring the secondary cell, a physical cell ID of the secondary cell and information about a carrier on which the secondary cell is located. Herein, the carrier on which the secondary cell is located may be referred to as a secondary component carrier.

(4) The term "or" describes an association relationship between associated objects and represents that three relationships may exist. For example, A or B may represent the following three cases: Only A exists, both A and B exist, and only B exists. "A plurality of" refers to two or more than two. Terms such as "first" and "second" are merely intended for purposes of description, and should not be understood as an indication or implication of relative importance, and cannot be understood as an indication or implication of a sequence.

Based on the foregoing descriptions, the following describes in detail the communication method and the communications apparatus provided in the embodiments of this application with reference to the accompanying drawings.

The following describes an architecture of a communications system to which the embodiments of this application are applicable.

FIG. 1 shows an architecture of a possible communications system to which a communication method provided in an embodiment of this application is applicable. Referring to FIG. 1, a communications system 100 includes a network device 101 and one or more terminals 102. When the communications system 100 includes a core network, the network device 101 may be further connected to the core network. The network device 101 may communicate with an IP network 103 by using the core network. For example, the IP network 103 may be an internet, a private IP network, or another data network. The network device 101 provides a service for terminals 102 covered by the network device 101. For example, referring to FIG. 1, the network device 101 provides wireless access for the one or more terminals 102 covered by the network device 101. In addition, there may be an overlapping area of coverage areas of network devices. For example, the communications system 100 may further include a network device 101', a network device 101, and a network device 101'. The network devices may further communicate with each other. For example, the network device 101 may communicate with the network device 101'.

The network device 101 is a device that enables the terminals 102 to access to a wireless network and that is in the communications system to which this application is applied, can configure secondary cells for the terminals 102, and activates or deactivates the secondary cells. The network device 101 is a node in a radio access network (RAN), and may also be referred to as a base station, or may be referred to as a RAN node (or device). Currently, some examples of the network device 101 include: a gNB/NR-NB, a transmission reception point (TRP), an evolved NodeB (eNB), a radio network controller (RNC), a NodeB (NB), a base station controller (BSC), a base transceiver station (BTS), a home NodeB (for example, a home evolved NodeB, or a home Node B, HNB), a baseband unit (BBU), or a wireless fidelity (Wi-Fi) access point (AP), or a network side device in a 5G communications system or a possible future communications system.

A terminal 102 is also referred to as user equipment (UE), a mobile station (MS), a mobile terminal (MT), or the like, and is a device that provides voice or data connectivity for a user, or may be an internet of things device. For example, the terminal 102 includes a handheld device and a vehicle-mounted device that have a wireless connection function. Currently, the terminal 102 may be a mobile phone, a tablet, a notebook computer, a palmtop computer, a mobile internet device (MID), a wearable device (such as a smartwatch, a smart band, or a pedometer), a vehicle-mounted device (such as a car, a bicycle, an electric vehicle, an airplane, a ship, a train, or a high-speed railway), a virtual reality (VR) device, an augmented reality (AR) device, a wireless terminal in industrial control, a smart home device (such as a refrigerator, a television, an air conditioner, or an electricity meter), a smart robot, a workshop device, a wireless terminal in self-driving (self driving), a wireless terminal in a remote surgery (remote medical surgery), a wireless terminal in a smart grid, a wireless terminal in transportation safety, a wireless terminal in a smart city, a wireless terminal in a smart home, a flight device (such as a smart robot, a hot balloon, a drone, or an aircraft), or the like.

The terminal 102 supports a carrier aggregation technology, and is configured to: measure one or more carriers notified by the network device 101, report a measurement result, and receive configuration for adding or modifying one or more secondary cells from the network device 101. The terminal 102 can perform data transmission with the network device 101 by using two or more carriers/cells.

The communications system shown in FIG. 1 may be a 4th generation (G) communications system, a 5th generation (5G) communications system, or a future communications system in various forms.

The communication method provided in the following embodiments of this application relates to measurement on carriers performed by a terminal. The carriers measured by the terminal are one or more carriers notified by a network device. After measuring the one or more carriers, the terminal reports a measurement result to the network device. The network device configures a secondary cell for the terminal. For ease of description, the one or more carriers may be referred to as carriers for short. The measurement or another operation performed on the carriers means that the measurement or the another operation is performed on any one of the foregoing one or more carriers.

Figure 2:
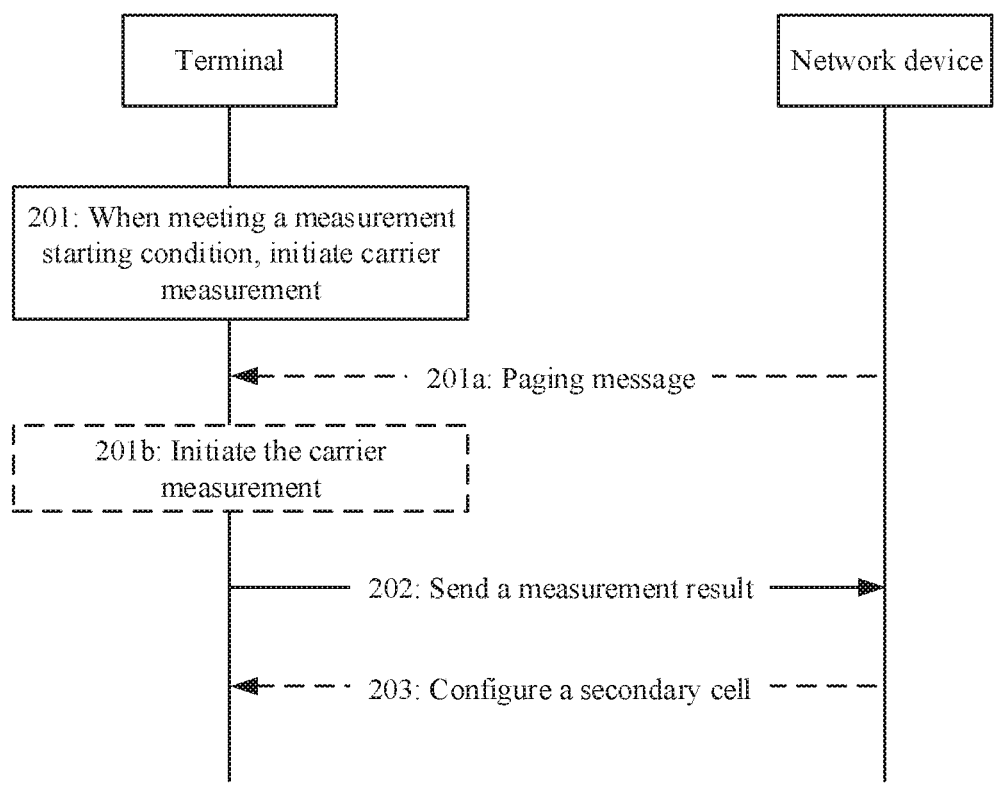
FIG. 2 is a schematic flowchart 1 of a communication method according to an embodiment of this application.

Based on the architecture of the communications system shown in FIG. 1, as shown in FIG. 2, the following describes in detail a communication method 1 according to an embodiment of this application.

Step 201: When a terminal is in an idle state and meets a measurement starting condition, the terminal initiates measurement on one or more carriers.

The measurement starting condition may be that a volume of to-be-sent data exceeds a first threshold or a paging message is received, or may be any condition under which a carrier aggregation technology needs to be started to send data.

The first threshold is notified by a network device to the terminal, or is preset in a protocol. A unit of the first threshold may be a bit, a byte, a megabyte (MB), or a gigabyte (GB).

If the measurement starting condition is that the paging message is received, step 201 may be divided into step 201a and step 201b.

Step 201a: The network device sends the paging message to the terminal, and the terminal receives the paging message sent by the network device.

Specifically, the network sends the paging message to the terminal. The network device may send the paging message to the terminal when the network device needs to send downlink data to the terminal, or when a volume of buffered to-be-sent downlink data exceeds a specific threshold. The threshold herein may be the same as or different from the first threshold.

The paging message is a paging message. In an optional manner, the network device adds new information to the paging message, and the information is used to indicate the terminal to start to measure the carriers. For example, a possible example of an information element of the paging message is as follows:

```
Paging-vxxxx-IEs ::=        SEQUENCE {
    idlemodemeasurement             ENUMERATED {true}
        OPTIONAL, -- Need ON
    nonCriticalExtension    Paging-v890-IEs
        OPTIONAL
}
```

The idlemodemeasurement is information indicating that measurement starts. A name and a location of the information are an example, and are not intended to limit this embodiment of this application.

In another optional manner, a paging message in an existing format is used. The network device sends the paging message in the existing format to the terminal. After receiving the paging message sent by the network device, the terminal initiates the measurement on the one or more carriers. The paging message in the existing format, for example, in the prior art, is used, that is, the paging message format in the prior art is not changed.

Optionally, the protocol specifies only one of the foregoing two optional manners, or the terminal and the network device negotiate in advance to send the paging message in one of the foregoing two optional manners.

Step 201b: The terminal initiates the measurement on the one or more carriers.

Step 202: The terminal sends an obtained measurement result to the network device.

Step 203: The network device sends configuration information to the terminal based on the measurement result, and the terminal receives the configuration information sent by the network device.

The configuration information includes a physical cell ID of a secondary cell configured by the network device for the terminal and information about a carrier on which the secondary cell is located, and the carrier on which the secondary cell is located is included in the one or more carriers measured by the terminal. Optionally, the information about the carrier on which the secondary cell is located includes frequency information and bandwidth information of the carrier on which the secondary cell is located.

Optionally, before step 201 is performed, the network device sends the configuration information to the terminal, and the terminal receives the configuration information. The configuration information is used for the terminal to measure the one or more carriers. For example, the network device may send a system broadcast message, where the system broadcast message carries the configuration information. The terminal in the idle state receives the system broadcast message and obtains the configuration information. For another example, the network device may send an RRC connection release message to the terminal in a connected state, where the RRC connection release message carries the configuration information. The terminal in the connected state receives the RRC connection release message and obtains the configuration information. After an RRC connection release process is completed, the terminal enters the idle state, and the terminal in the idle state measures the secondary cell based on the configuration information.

The configuration information may include at least one of the following:

1. Information about the one or more to-be-measured carriers. Specifically, for example, the information is center frequency information or center frequencies of the carriers.

2. Measurement bandwidth of the one or more to-be-measured carriers.

3. A list of to-be-measured cells. A corresponding list of cells may be configured for each carrier, and the list may include a physical cell ID or a global cell ID.

4. A to-be-measured parameter. For example, the to-be-measured parameter may include: reference signal received power (Reference Signal Receiving Power, RSRP), reference signal received quality (Reference Signal Receiving Quality, RSRQ), a received signal strength indication (RSSI), a signal to interference plus noise ratio (SINR), or the like. In actual application, the to-be-measured parameter may be configured based on an actual requirement.

5. A condition for including a value of a measured parameter in the measurement report. When the value of the measured parameter meets a measurement criterion or a preset event, or is greater than or equal to a preset threshold, the value of the measured parameter is included in the measurement report. For a specific condition for including the value of the measured parameter in the measurement report, refer to a condition for triggering the measurement report in the prior art. The condition for triggering the measurement report may be used as the condition for including the value of the measured parameter in the measurement report.

The including the value of the measured parameter in the measurement report refers to updating or overwriting an original measurement value based on the measured value, to obtain the measurement report.

Content of the foregoing configuration information and examples in the configuration information are all examples for description, and are not intended to limit this embodiment of this application.

In step 201, after initiating the measurement on the one or more carriers, the terminal performs the measurement for a period of time to obtain and store the measurement result, or may obtain and store the measurement result after combining measurement performed for several times.

In step 202, after obtaining an uplink resource, the terminal sends the obtained measurement result to the network device, and the network device receives the measurement result.

Figure 3:
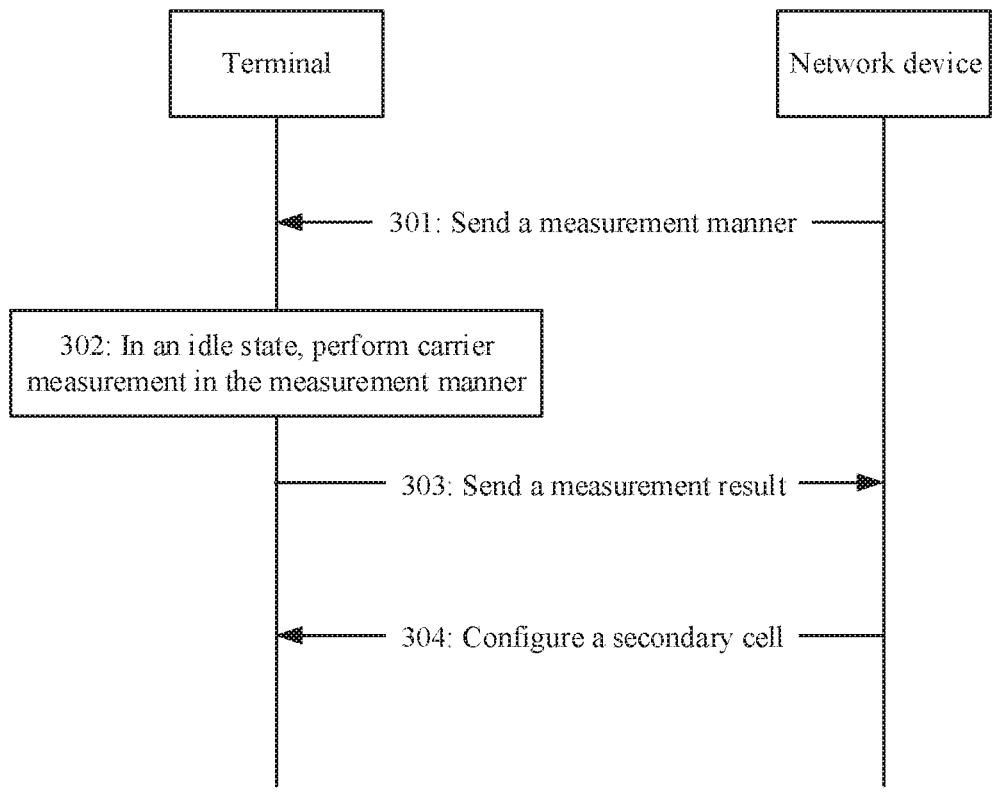
FIG. 3 is a schematic flowchart 2 of a communication method according to an embodiment of this application.

Based on the architecture of the communications system shown in FIG. 1, as shown in FIG. 3, the following describes in detail a communication method 2 according to an embodiment of this application.

Step 301: A network device sends a measurement manner to a terminal, and the terminal receives the measurement manner sent by the network device.

Specifically, the measurement manner is included in configuration information, and the network device sends the configuration information to the terminal. In addition to the measurement manner, the configuration information further includes other information. For other information included in the configuration information and a purpose of the configuration information, refer to the description of the configuration information in the foregoing embodiments. Details are not described herein again.

Optionally, the measurement manner may be further specified in a protocol.

Step 302: The terminal measures, in an idle state, one or more carriers.

Specifically, the terminal measures the carriers in the measurement manner sent by the network device. If there are a plurality of measurement manners sent by the network device, the terminal selects one of the plurality of measurement manners, to measure the carriers.

Optionally, once entering the idle state, the terminal starts to measure the one or more carriers. Alternatively, after the terminal enters the idle state, as described in the communication method 1 provided in the foregoing embodiments, and meets a measurement starting condition, the terminal initiates the measurement on the one or more carriers. If the terminal measures the one or more carriers when the terminal meets the measurement starting condition, for operations performed by the terminal and the network device, refer to descriptions in the communication method 1 provided in the foregoing embodiments. Details are not described herein again.

Step 303: The terminal sends an obtained measurement result to the network device, and the network device receives the measurement result sent by the terminal.

Step 304: The network device sends configuration information to the terminal based on the measurement result, and the terminal receives the configuration information sent by the network device.

The configuration information includes a physical cell ID of a secondary cell configured by the network device for the terminal and information about a carrier on which the secondary cell is located, and the carrier on which the secondary cell is located is included in the one or more carriers measured by the terminal. Optionally, the information about the carrier on which the secondary cell is located includes frequency information and bandwidth information of the carrier on which the secondary cell is located.

Optionally, before step 301 is performed, the network device sends the configuration information to the terminal, and the terminal receives the configuration information. The configuration information is used for the terminal to measure the one or more carriers. Optionally, the configuration information may include priorities of the carriers, and the terminal determines the foregoing one or more to-be-measured carriers based on the priorities of the carriers. The priorities may be indicated by using numbers, or may be indicated by using levels, for example, a high priority, a medium priority, and a low priority. The terminal determines, based on the priorities of the carriers, a carrier with a high priority as a to-be-measured carrier, or selects a carrier with a priority higher than 3 as a to-be-measured carrier. Some carriers are selected based on the priorities for measurement, so that power consumption of the terminal can be reduced. Specifically, a method for sending the configuration information and content of the configuration information is described in the foregoing embodiments. Details are not described herein again.

The following specifically describes a specific process in which the terminal measures the one or more carriers, and the process includes but is not limited to any one or a combination of several of the following manners. A quantity of carriers or a list of carriers measured by the terminal is notified by the network device, for example, notified by sending the configuration information. For ease of description, in this embodiment of this application, that the terminal measures the one or more carriers may be briefly described as that the terminal measures the carriers. As mentioned above, there may be two optional occasions for the terminal in the idle state to initiate the measurement on the carriers. After initiating the measurement on the secondary cell, the terminal may perform the measurement in the following manners.

Manner 1: The carriers are measured based on first measurement duration.

The first measurement duration is a specific time length notified by the network device to the terminal in step 301, or is a specific time length specified in a protocol. For example, if the first measurement duration is 20 ms, the terminal performs measurement for 20 ms, to obtain and store the measurement result.

Manner 2: The carriers are measured based on second measurement duration determined based on a speed or the height of the terminal.

Specifically, in a measurement process performed by the terminal, if the height or the speed changes, the measurement result is affected to some extent. For example, when the terminal is in a high-speed movement state, a channel state also changes sharply. For another example, when the terminal is at a high altitude, a channel state at the high altitude changes faster than a channel state on the ground. Based on this, in this embodiment of this application, the terminal adjusts measurement duration based on the state of the terminal.

Optionally, the measurement manner sent by the network device or the measurement manner specified in the protocol includes the first measurement duration, and the measurement manner may further include a first group of adjustment factors and a first correspondence between each adjustment factor in the first group of adjustment factors and a height range, or a second group of adjustment factors and a second correspondence between each adjustment factor in the second group of adjustment factors and a speed range. The height range includes at least one consecutive height value, or a height level value, or includes a start value and an end value of the height. The speed range includes at least one consecutive speed value, or a speed level value, or includes a start value and an end value of the speed.

The terminal determines, based on the first correspondence, a first adjustment factor corresponding to the height range to which the current height belongs, and determines the second measurement duration based on the first measurement duration and the first adjustment factor. For example, a product of the first measurement duration and the first adjustment factor is determined as the second measurement duration. Alternatively, the terminal determines, based on the second correspondence, a second adjustment factor corresponding to the speed range to which the current speed belongs, and determines the second measurement duration based on the first measurement duration and the second adjustment factor. For example, a product of the first measurement duration and the second adjustment factor is determined as the second measurement duration. Certainly, the second measurement duration may further be determined in a manner of performing another operation on the first measurement duration and the adjustment factors.

Optionally, the terminal may further determine first sub-duration based on the first correspondence and the current height, determine second sub-duration based on the second correspondence and the current speed, and determine the second measurement duration based on the first sub-duration and the second sub-duration. For example, an arithmetic average value, a weighted average value, or a weighted sum value of the first sub-duration and the second sub-duration is used as the second measurement duration. For a method for determining the first sub-duration and the second sub-duration, refer to the foregoing description. The weight used in a calculation process is configured by the base station or specified in the protocol.

It is assumed that the first measurement duration is represented by T, the second measurement duration is represented by T', the first group of adjustment factors is represented by S, where $S=\{S_1, S_2, S_3, \ldots, S_n\}$, and correspondingly, a set of height ranges is represented by H, where $H=\{H_1, H_2, H_3, \ldots, H_n\}$, $H_1$ has a correspondence with $S_1$, $H_2$ has a correspondence with $S_2$, $H_3$ has a correspondence with $S_3, \ldots$, and $H_n$ has a correspondence with $S_n$. The second group of adjustment factors is represented by S', where $S'=\{S_1', S_2', S_3', \ldots, S_n'\}$, and corresponding, a set of speed ranges is represented by V, where $V=\{V_1, V_2, V_3, \ldots, V_n\}$, $V_1$ has a correspondence with $S_1'$, $V_2$ has a correspondence with $S_2'$, $V_3$ has a correspondence with $S_3', \ldots$, and $V_n$ has a correspondence with $S_n'$.

For example, the set of the height ranges includes two elements: $H=\{H_1, H_2\}$, where $H_1$ represents a low altitude, and $H_2$ represents a high altitude. Correspondingly, the first group of adjustment factors also includes two elements: $S=\{S_1, S_2\}$. When the height of the terminal is at the low altitude, the first measurement duration is multiplied by S, to obtain the second measurement duration, that is, $T'=T*S_1$. When the height of the terminal is at the high altitude, the first measurement duration is multiplied by $S_2$, to obtain the second measurement duration, that is, $T'=T*S_2$.

Alternatively, the set of the speed ranges includes three elements: $V=\{V_1, V_2, V_3\}$, where $V_1$ represents a low speed, $V_2$ represents a medium speed, and $V_3$ represents a high speed. Correspondingly, the second group of adjustment factors also includes three elements: $S'=\{S_1', S_2', S_3'\}$. When the speed of the terminal is at the low speed, the first measurement duration is multiplied by $S_1'$, to obtain the second measurement duration, that is, $T'=T*S_1'$. When the height of the terminal is at the medium speed, the first measurement duration is multiplied by $S_2'$, to obtain the second measurement duration, that is, $T'=T*S_2'$. When the height of the terminal is at the high speed, the first measurement duration is multiplied by $S_3'$, to obtain the second measurement duration, that is, $T'=T*S_3'$.

Optionally, the measurement manner sent by the network device or the measurement manner specified in the protocol includes: a first group of measurement duration and a third correspondence between each measurement duration in the first group of measurement duration and the height range, or the measurement manner includes a second group of measurement duration and a fourth correspondence between each measurement duration in the second group of measurement duration and the speed range. The height range includes at least one consecutive height value, or includes a start value and an end value of the height. The speed range includes at least one consecutive speed value, or includes a start value and an end value of the speed.

The terminal determines, based on the third correspondence, duration that is in the first group of measurement duration and that has a correspondence with the height range to which the current height belongs, as the second measurement duration. Alternatively, the terminal determines, based on the fourth correspondence, duration that is in the second group of measurement duration and that has a correspondence with the speed range to which the current speed belongs, as the second measurement duration.

Optionally, the terminal may further determine third sub-duration based on the third correspondence and the current height, determine fourth sub-duration based on the fourth correspondence and the current speed, and determine the second measurement duration based on the third sub-duration and the fourth sub-duration. For example, an arithmetic average value, a weighted average value, or a weighted sum value of the third sub-duration and the fourth sub-duration is used as the second measurement duration. For a method for determining the third sub-duration and the third sub-duration, refer to the foregoing description.

Manner 3: The carriers are measured in a periodic measurement manner.

Specifically, the measurement manner sent by the network device to the terminal or the measurement manner specified in the protocol includes at least two of cycle duration, a measurement time length, and an interval time length. The cycle duration is a sum of the measurement time length and the interval time length. The terminal periodically measures the carriers based on at least two of the cycle duration, the measurement time length, and the interval time length.

Figure 4:
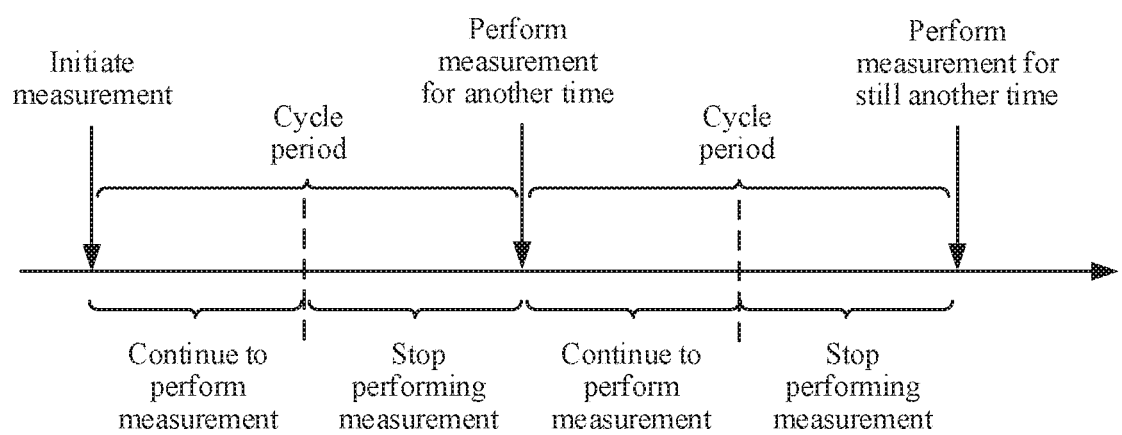
FIG. 4 is a schematic diagram of a periodic measurement method performed by a terminal according to an embodiment of this application.

FIG. 4 is a schematic diagram of a measurement method performed by a terminal in any two adjacent periodicities. In one periodicity, the terminal continuously measures the carriers in a time part corresponding to the measurement time length, and stops measuring the carriers in a time part corresponding to the interval time length (in other words, the carriers are not measured).

Manner 4: The carriers are measured for one time to obtain a first measurement value, and if a distance between a current location of the terminal and a location at which the terminal performs measurement last time is greater than a second threshold, measurement on the carriers is performed for another time to obtain a second measurement value, and the second measurement value is used to update the first measurement value or the second measurement value is used as the measurement result.

Figure 5:
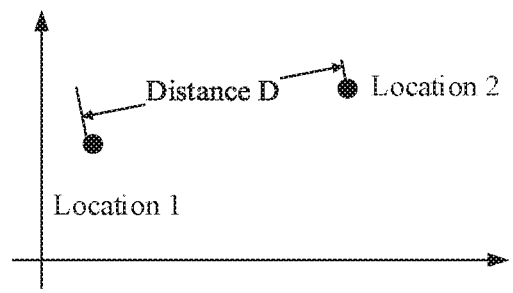
FIG. 5 is a schematic diagram of a measurement method that is based on location change of a terminal according to an embodiment of this application.

Specifically, the terminal stores the measurement result, and reports the measurement result after obtaining an uplink resource. However, if the terminal reports the measurement result of latest measurement after moving a relatively long distance, the measurement result cannot reflect a channel state of a latest location after the terminal moves. For example, as shown in FIG. 5, the terminal performs measurement for one time at a location 1 and stores a measurement result 1, the terminal moves to a location 2, a distance between the location 2 and the location 1 reaches a threshold D, and channel state information at the location 2 may be inconsistent with channel state information at the location 1. If the measurement result 1 is reported at the location 2 or at a location 3 to which the terminal continues to move, reliability of the measurement result is affected. In this embodiment of this application, when a distance between a current location of the terminal and a location at which the terminal performs measurement last time is greater than one threshold (which is denoted as a second threshold herein), the carriers are re-measured. The second measurement value is determined based on a result of the re-measurement and a result of the latest measurement, and the second measurement value is stored and reported. In this way, it can be ensured that the second measurement value is consistent with channel state information of a location to which the terminal currently moves, thereby helping ensure accuracy of the reported measurement result. Specifically, in a manner of L3 filtering, the second measurement value is used as a current value, the first measurement value is used as a historical value, and L3 filtering is performed to obtain an updated result. Alternatively, the second measurement value is directly used for reporting, that is, the second measurement value is used to replace the first measurement value.

Manner 5: Measurement duration of each carrier is determined based on a priority of the carrier.

For a carrier with a relatively high priority, measurement duration is relatively long; for a carrier with a relatively low priority, measurement duration is relatively short. Optionally, the measurement manner notified by the network device to the terminal or specified in the protocol includes a correspondence between a priority and measurement duration. The terminal determines, based on the correspondence between a priority and measurement duration, measurement duration corresponding to the secondary cell, and measures the secondary cell for the corresponding measurement duration.

It should be noted that the terminal may measure the carrier in any one of the foregoing manner 1 to manner 4, or may measure the secondary cell with reference to any several of the foregoing manner 1 to manner 4. For example, manner 2 and manner 3 are combined. The terminal performs, in one periodicity, measurement based on the second measurement duration determined based on the height or the speed of the terminal, and stops the measurement in a time part obtained by subtracting the second measurement duration from the cycle duration. For another example, manner 2 and manner 4 are combined, the terminal measures the carrier for one time to obtain the first measurement value. If a distance between a current location of the terminal and a location at which the terminal performs measurement last time is greater than the second threshold, measurement on the carrier is performed for another time to obtain the second measurement value. Measurement duration for obtaining the first measurement value or the second measurement value by the terminal may be determined based on the height or the speed of the terminal.

So far, the communication method 1 and the communication method 2 that are provided in the embodiments of this application are described. It should be noted that the communication method 1 and the communication method 2 may be combined to constitute a solution that needs to be protected in this application. In step 201 in the communication method 1, the terminal may measure the one or more carriers in a manner provided in the communication method 2. In step 302 in the communication method 2, the terminal may initiate the measurement on the one or more carriers in a manner provided in the communication method 1.

Figure 6:
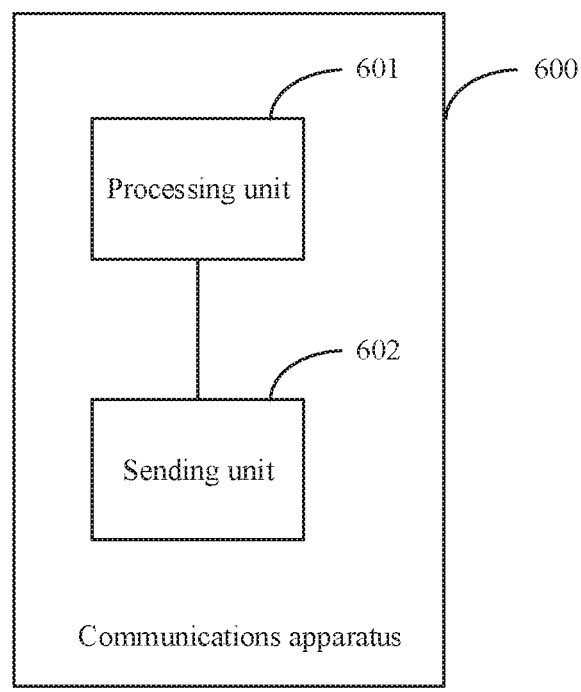
FIG. 6 is a schematic structural diagram 1 of a communications apparatus according to an embodiment of this application.

Based on a same inventive concept as that of the foregoing communication method 1, as shown in FIG. 6, an embodiment of this application further provides a communications apparatus 600. The communications apparatus 600 is configured to implement the communication method 1 provided in the foregoing embodiments. The communications apparatus 600 includes:

a processing unit 601, configured to: when in an RRC idle state, and meeting a measurement starting condition, initiate measurement on one or more carriers, where the measurement starting condition may be that a volume of to-be-sent data exceeds a first threshold, or a paging message is received; and a sending unit 602, configured to send an obtained measurement result to a network device.

In addition, the processing unit 601 and the sending unit 602 in the communications apparatus 600 may further implement other operations or functions performed by the terminal in the communication method 1 provided in the above embodiments. Details are not repeatedly described.

The terminal measures, in the idle state, the carriers, and can report the measurement result after obtaining an uplink resource. This helps implement quick reporting of the measurement result, thereby shortening a delay in configuring a secondary cell, improving utilization of a carrier aggregation technology, and further improving efficiency of system data transmission. A specific implementation solution of measuring the carriers in the idle state is provided by setting the measurement starting condition.

Figure 7:
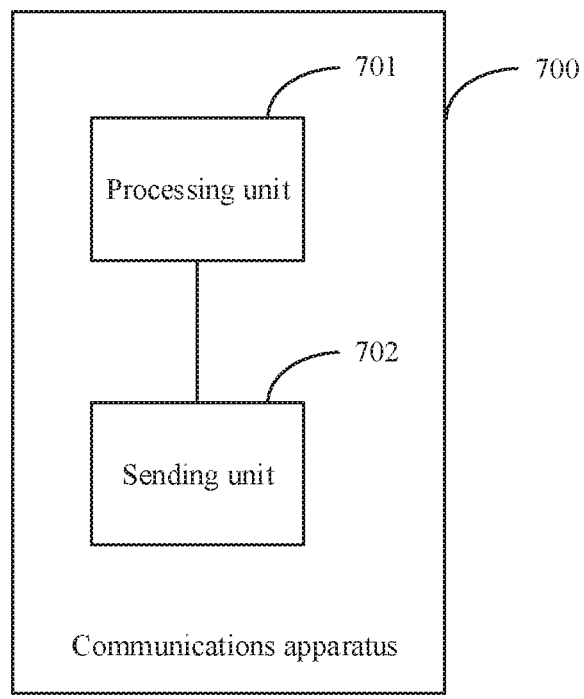
FIG. 7 is a schematic structural diagram 2 of a communications apparatus according to an embodiment of this application.

Based on a same inventive concept as that of the foregoing communication method 2, as shown in FIG. 7, an embodiment of this application further provides a communications apparatus 700. The communications apparatus 700 is configured to implement the communication method 2 provided in the foregoing embodiments. The communications apparatus 700 includes:

a processing unit 701, configured to: when in an RRC idle state, measure one or more carriers; and a sending unit 702, configured to send, on an uplink resource, an obtained measurement result to a network device.

Specifically, the processing unit 701 may measure the one or more carriers in any one of the following manners. For example, the one or more carriers are measured based on first measurement duration. Optionally, the first measurement duration herein may be notified by the network device, or may be specified in a protocol. For another example, the one or more carriers are measured based on second measurement duration determined based on a speed or the height of a terminal, where the speed or the height is a state of the terminal, and the speed or the height herein may be alternatively replaced with another state of the terminal. Different states of the terminal indicate different measurement duration. For still another example, the one or more carriers are measured in a periodic measurement manner. For yet another example, the one or more carriers are measured for one time to obtain a first measurement value. If a distance between a current location of the terminal and a location at which the terminal performs measurement last time is greater than a second threshold, the one or more carriers are measured for another time to obtain a second measurement value, and the measurement result is determined based on the second measurement value. The second measurement value covering the first measurement value may be directly used as the measurement result; or after a specific operation is performed based on the second measurement value and the first measurement value, an obtained operation result is used as the measurement result. The manner avoids a case in which a latest measurement result cannot reflect a channel state of the current location of the terminal due to movement of the terminal, and improves accuracy and reliability of the measurement result of the carriers.

By designing the foregoing several measurement manners, a specific design solution of measuring, in the idle state, duration of the carriers is provided.

In addition, the processing unit 701 and the sending unit 702 in the communications apparatus 700 may further implement other operations or functions performed by the terminal in the communication method 2 provided in the above embodiments. Details are not repeatedly described.

Figure 8:
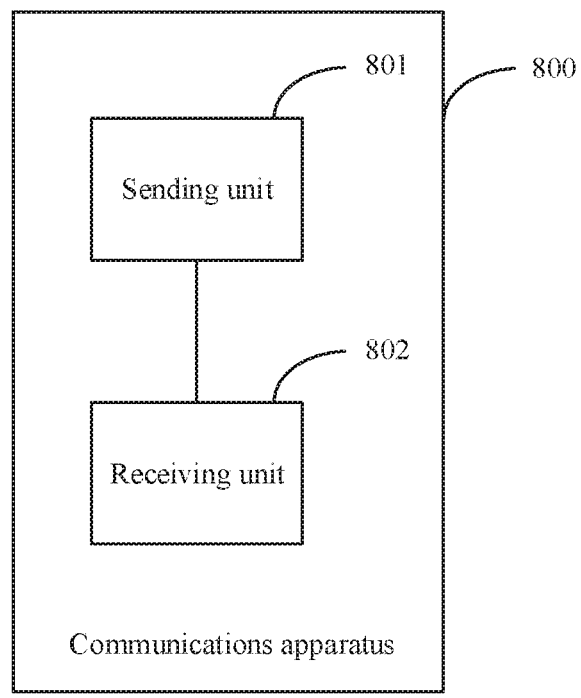
FIG. 8 is a schematic structural diagram 3 of a communications apparatus according to an embodiment of this application.

Based on a same inventive concept as that of the foregoing communication method 1, as shown in FIG. 8, an embodiment of this application further provides a communications apparatus 800. The communications apparatus 800 is configured to implement the communication method 1 provided in the foregoing embodiments. The communications apparatus 800 includes: a sending unit 801, configured to send a paging message to a terminal, where the paging message is used to indicate the terminal to initiate, in an idle state, measurement on one or more carriers.

The paging message carries indication information, and the indication information is used to indicate the terminal to start to measure the carriers. In this way, when receiving the paging message, the terminal initiates, based on the information carried in the paging message, measurement on the carriers. Optionally, the paging message may be designed by using an existing IE. The paging message designed by using the existing IE is used to indicate the terminal to start to measure the carriers. Once receiving the paging message, the terminal initiates the measurement on the carriers.

The communications apparatus 800 further includes a receiving unit 802, configured to receive a measurement result sent by the terminal.

In this way, the terminal measures, in the idle state, the carriers, and can report the measurement result after obtaining an uplink resource. This helps implement quick reporting of the measurement result, thereby shortening a delay in configuring a secondary cell, improving utilization of a carrier aggregation technology, and further improving efficiency of system data transmission.

In addition, the sending unit 801 and the receiving unit 802 in the communications apparatus 800 may further implement other operations or functions performed by the network device in the communication method 1 provided in the above embodiments. Details are not repeatedly described.

Figure 9:
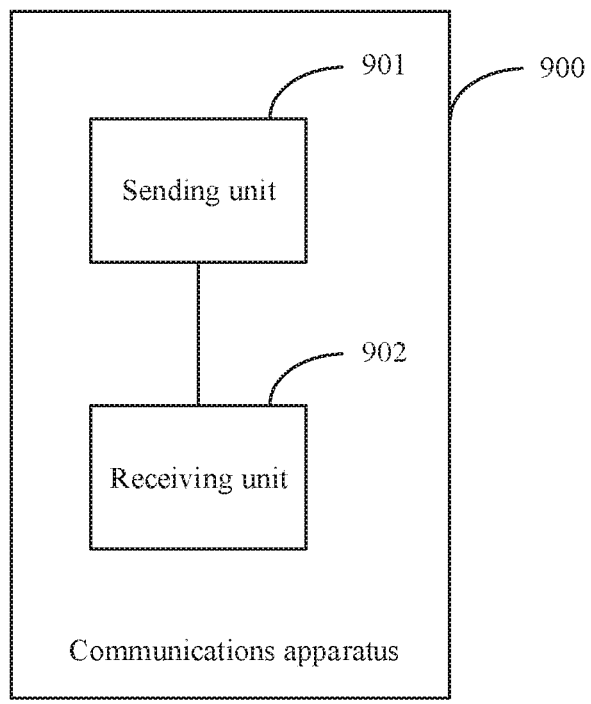
FIG. 9 is a schematic structural diagram 4 of a communications apparatus according to an embodiment of this application.

Based on a same inventive concept as that of the foregoing communication method 2, as shown in FIG. 9, an embodiment of this application further provides a communications apparatus 900. The communications apparatus 900 is configured to implement the communication method 2 provided in the foregoing embodiments. The communications apparatus 900 includes: a sending unit 901, configured to send a measurement manner to a terminal, where the measurement manner is a manner used to indicate the terminal to measure, in an idle state, one or more carriers.

The measurement manner includes: first measurement duration, or a manner of determining second measurement duration based on first measurement duration and the height of the terminal, or a manner of determining second measurement duration based on first measurement duration and a speed of the terminal, or a periodic measurement manner, or a manner of performing measurement for another time when a movement distance after measurement is performed for one time exceeds a threshold. According to the foregoing design of the second measurement duration, the measurement duration may be dynamically adjusted based on a state of the terminal. For example, the second measurement duration may be calculated, so that a larger value of the speed or the height of the terminal indicates a larger value of the second measurement duration, and relatively long carrier measurement duration can be obtained at a high speed or at a high altitude, so that the measurement result is more accurate and reliable.

The communications apparatus 900 further includes a receiving unit 902, configured to receive the measurement result sent by the terminal.

In addition, the sending unit 901 and the receiving unit 902 in the communications apparatus 900 may further implement other operations or functions performed by the network device in the communication method 2 provided in the above embodiments. Details are not repeatedly described.

The terminal measures, in the idle state, the carriers, and can report the measurement result after obtaining an uplink resource. This helps implement quick reporting of the measurement result, thereby shortening a delay in configuring a secondary cell, improving utilization of a carrier aggregation technology, and further improving efficiency of system data transmission.

Figure 10:
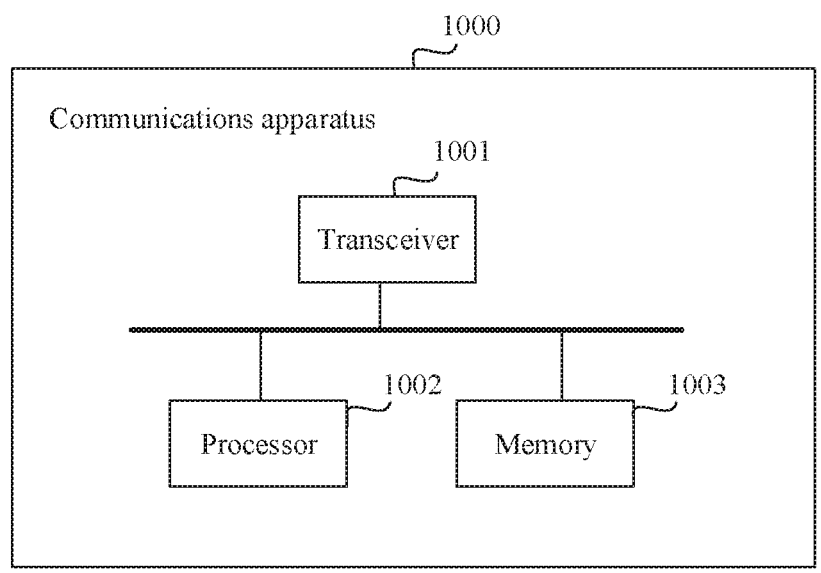
FIG. 10 is a schematic structural diagram 5 of a communications apparatus according to an embodiment of this application.

Based on a same inventive concept as that of the foregoing communication method 1, as shown in FIG. 10, an embodiment of this application further provides a communications apparatus 1000. The communications apparatus 1000 is configured to implement operations performed by the terminal in the communication method 1 provided in the foregoing embodiments. The communications apparatus 1000 includes: a transceiver 1001, a processor 1002, and a memory 1003. The transceiver 1001 is optional. The processor 1002 is configured to invoke a group of programs. When the programs are executed, the processor 1002 is enabled to perform operations performed by the terminal in the communication method 1 provided in the foregoing embodiments. The memory 1003 is configured to store the programs executed by the processor 1002. The function module processing unit 601 in FIG. 6 may be implemented by using the processor 1002, and the sending unit 602 may be implemented by using the transceiver 1001.

The processor 1002 may be a central processing unit (CPU), a network processor (NP), or a combination of the CPU and the NP.

The processor 1002 may further include a hardware chip. The foregoing hardware chip may be an application-specific integrated circuit (ASIC), a programmable logic device (PLD), or a combination thereof. The foregoing PLD may be a complex programmable logic device (CPLD), a field programmable gate array (field-programmable gate array, FPGA), a generic array logic (GAL), or any combination thereof.

The memory 1003 may include a volatile memory, for example, a random access memory (random-access memory, RAM). The memory 1003 may further include a non-volatile memory, for example, a flash memory, a hard disk drive (HDD), or a solid-state drive (SSD). The memory 1003 may further include a combination of the foregoing types of memories.

The terminal measures, in the idle state, the carriers, and can report the measurement result after obtaining an uplink resource. This helps implement quick reporting of the measurement result, thereby shortening a delay in configuring a secondary cell, improving utilization of a carrier aggregation technology, and further improving efficiency of system data transmission. A specific implementation solution of measuring the carriers in the idle state is provided by setting a measurement starting condition.

Figure 11:
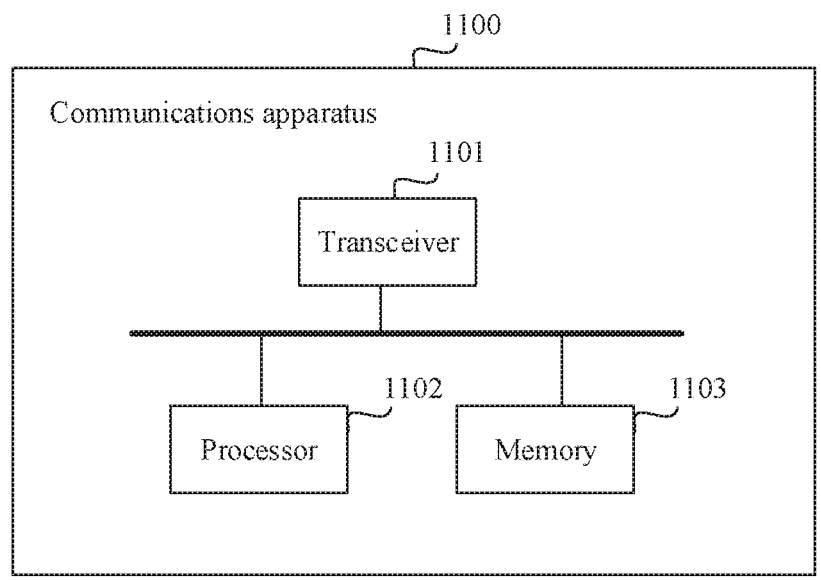
FIG. 11 is a schematic structural diagram 6 of a communications apparatus according to an embodiment of this application.

Based on a same inventive concept as that of the foregoing communication method 2, as shown in FIG. 11, an embodiment of this application further provides a communications apparatus 1100. The communications apparatus 1100 is configured to implement operations performed by the terminal in the communication method 2 provided in the foregoing embodiments. The communications apparatus 1100 includes: a transceiver 1101, a processor 1102, and a memory 1103. The transceiver 1101 is optional. The processor 1102 is configured to invoke a group of programs. When the programs are executed, the processor 1102 is enabled to perform operations performed by the terminal in the communication method 2 provided in the foregoing embodiments. The memory 1103 is configured to store the programs executed by the processor 1102. The function module processing unit 701 in FIG. 7 may be implemented by using the processor 1102, and the sending unit 702 may be implemented by using the transceiver 1101.

By designing several measurement manners, a specific design solution of measuring, in the idle state, duration of the carriers is provided.

The processor 1102 may be a central processing unit (CPU), a network processor (NP), or a combination of the CPU and the NP.

The processor 1102 may further include a hardware chip. The foregoing hardware chip may be an application-specific integrated circuit (ASIC), a programmable logic device (PLD), or a combination thereof. The foregoing PLD may be a complex programmable logic device (CPLD), a field programmable gate array (field-programmable gate array, FPGA), a generic array logic (GAL), or any combination thereof.

The memory 1103 may include a volatile memory, for example, a random access memory (random-access memory, RAM). The memory 1103 may further include a non-volatile memory, for example, a flash memory, a hard disk drive (HDD), or a solid-state drive (SSD). The memory 1103 may further include a combination of the foregoing types of memories.

Figure 12:
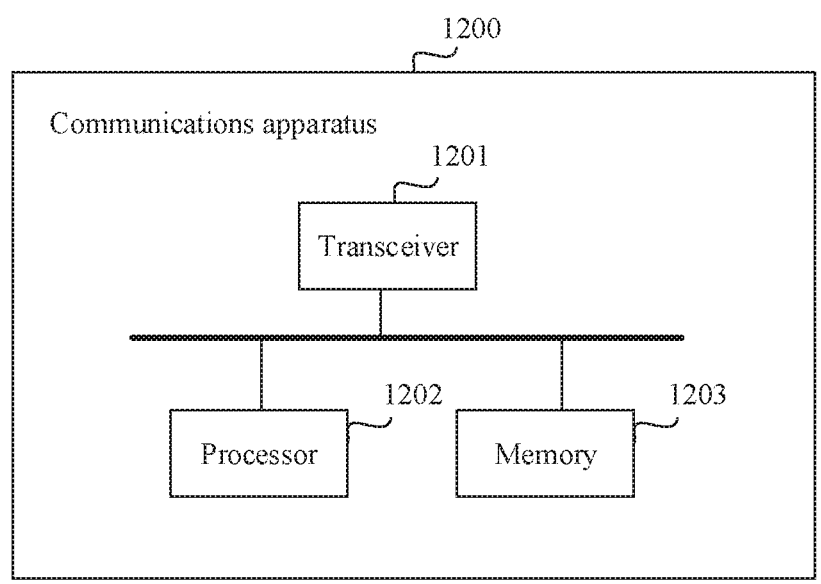
FIG. 12 is a schematic structural diagram 7 of a communications apparatus according to an embodiment of this application.

Based on a same inventive concept as that of the foregoing communication method 1, as shown in FIG. 12, an embodiment of this application further provides a communications apparatus 1200. The communications apparatus 1200 is configured to implement operations performed by the network device in the communication method 1 provided in the foregoing embodiments. The communications apparatus 1200 includes: a transceiver 1201, a processor 1202, and a memory 1203. The transceiver 1201 is optional. The processor 1202 is configured to invoke a group of programs. When the programs are executed, the processor 1202 is enabled to perform operations performed by the network device in the communication method 1 provided in the foregoing embodiments. The memory 1203 is configured to store the programs executed by the processor 1202. The function module sending unit 801 and receiving unit 802 in FIG. 8 may be implemented by using the transceiver 1201.

The processor 1202 may be a central processing unit (CPU), a network processor (NP), or a combination of the CPU and the NP.

The processor 1202 may further include a hardware chip. The foregoing hardware chip may be an application-specific integrated circuit (ASIC), a programmable logic device (PLD), or a combination thereof. The foregoing PLD may be a complex programmable logic device (CPLD), a field programmable gate array (field-programmable gate array, FPGA), a generic array logic (GAL), or any combination thereof.

The memory 1203 may include a volatile memory, for example, a random access memory (random-access memory, RAM). The memory 1203 may further include a non-volatile memory, for example, a flash memory, a hard disk drive (HDD), or a solid-state drive (SSD). The memory 1203 may further include a combination of the foregoing types of memories.

Figure 13:
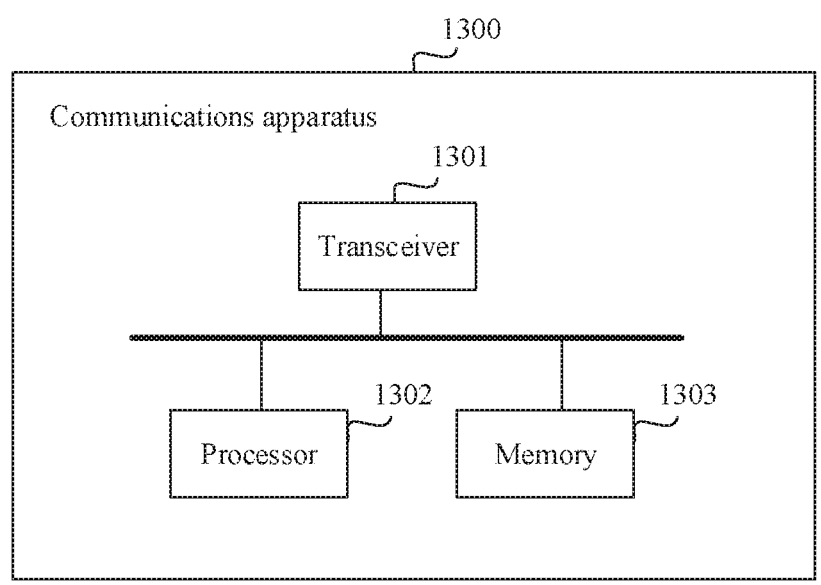
FIG. 13 is a schematic structural diagram 8 of a communications apparatus according to an embodiment of this application.

Based on a same inventive concept as that of the foregoing communication method 2, as shown in FIG. 13, an embodiment of this application further provides a communications apparatus 1300. The communications apparatus 1300 is configured to implement operations performed by the network device in the communication method 2 provided in the foregoing embodiments. The communications apparatus 1300 includes: a transceiver 1301, a processor 1302, and a memory 1303. The transceiver 1301 is optional. The processor 1302 is configured to invoke a group of programs. When the programs are executed, the processor 1302 is enabled to perform operations performed by the network device in the communication method 2 provided in the foregoing embodiments. The memory 1303 is configured to store the programs executed by the processor 1302. The function module sending unit 901 and receiving unit 902 in FIG. 9 may be implemented by using the transceiver 1301.

By designing several measurement manners, a specific design solution of measuring, in the idle state, duration of the carriers is provided.

The processor 1302 may be a central processing unit (CPU), a network processor (NP), or a combination of the CPU and the NP.

The processor 1302 may further include a hardware chip. The foregoing hardware chip may be an application-specific integrated circuit (ASIC), a programmable logic device (PLD), or a combination thereof. The foregoing PLD may be a complex programmable logic device (CPLD), a field programmable gate array (field-programmable gate array, FPGA), a generic array logic (GAL), or any combination thereof.

The memory 1303 may include a volatile memory, for example, a random access memory (random-access memory, RAM). The memory 1303 may further include a non-volatile memory, for example, a flash memory, a hard disk drive (HDD), or a solid-state drive (SSD). The memory 1303 may further include a combination of the foregoing types of memories.

In the communication method 1 and the communication method 2 that are provided in the foregoing embodiments of this application, some or all of the described operations and functions performed by the terminal may be completed by using a chip or an integrated circuit.

To implement functions of the apparatus in FIG. 6 or FIG. 10, an embodiment of this application further provides a chip, including a processor, configured to support the apparatus in implementing functions of the terminal in the foregoing communication method 1. In a possible design, the chip is connected to a memory or the chip includes the memory, and the memory is configured to store a program instruction and data that are necessary for the apparatus.

To implement functions of the apparatus in FIG. 7 or FIG. 11, an embodiment of this application further provides a chip, including a processor, configured to support the apparatus in implementing functions of the terminal in the foregoing communication method L In a possible design, the chip is connected to a memory or the chip includes the memory, and the memory is configured to store a program instruction and data that are necessary for the apparatus.

To implement functions of the apparatus in FIG. 8 or FIG. 12, an embodiment of this application further provides a chip, including a processor, configured to support the apparatus in implementing functions of the network device in the foregoing communication method 2. In a possible design, the chip is connected to a memory or the chip includes the memory, and the memory is configured to store a program instruction and data that are necessary for the apparatus.

To implement functions of the apparatus in FIG. 9 or FIG. 13, an embodiment of this application further provides a chip, including a processor, configured to support the apparatus in implementing functions of the network device in the foregoing communication method 2. In a possible design, the chip is connected to a memory or the chip includes the memory, and the memory is configured to store a program instruction and data that are necessary for the apparatus.

An embodiment of this application provides a computer storage medium. The computer storage medium stores a computer program, and the computer program includes an instruction used to perform the foregoing communication method 1 or communication method 2.

An embodiment of this application further provides a computer program product including an instruction. When the computer program product runs on a computer, the computer is enabled to perform the foregoing communication method 1 or communication method 2.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

The computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

The computer program instructions may be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application are described, persons skilled in the art may make changes and modifications to the embodiments once they learn the basic inventive concept. Therefore, the following claims are intended to be construed as to cover the preferred embodiments and all changes and modifications falling within the scope of this application.

Certainly, persons skilled in the art may make various modifications and variations to the embodiments of this application without departing from the spirit and scope of the embodiments of this application. This application is intended to cover the modifications and variations provided that they fall within the scope of protection defined by the following claims and their equivalent technologies.

What is claimed is:

1. A communication method, comprising:
  initiating, by a terminal in an idle state, measurement on one or more carriers when an amount of to-be-sent data exceeds a first threshold, or initiating the measurement on the one or more carriers in response to the terminal receiving a paging message that pages the terminal for receiving a downlink signal and that instructs the terminal to initiate the measurement on the one or more carriers; and
  sending, by the terminal on an uplink resource, a measurement result of the measurement on the one or more carriers to a network device; and
  wherein the measurement on the one or more carriers is performed by:
    measuring, by the terminal, the one or more carriers based on a first measurement duration; or
    measuring, by the terminal, the one or more carriers based on a second measurement duration determined based on a speed or a height of the terminal; or
    measuring, by the terminal, the one or more carriers in a periodic measurement manner; or
    measuring, by the terminal, the one or more carriers to obtain a first measurement value, and when a distance between a current location of the terminal and a location at which the terminal performs the measurement is greater than a second threshold, measuring the one or more carriers to obtain a second measurement value, wherein the second measurement value is used as the measurement result; and
  wherein measuring the one or more carriers in the periodic measurement manner comprises:
    measuring, by the terminal, the one or more carriers in the periodic measurement manner based on at least two of a cycle duration, a measurement time length, and an interval time length.

2. The method according to claim 1, further comprising:
  determining, by the terminal, a first adjustment factor based on the height of the terminal, and determining, by the terminal, the second measurement duration based on the first adjustment factor and the first measurement duration; or
  determining, by the terminal, a second adjustment factor based on the speed of the terminal, and determining, by the terminal, the second measurement duration based on the second adjustment factor and the first measurement duration.

3. The method according to claim 1, further comprising:
  receiving, by the terminal, priorities of carriers that are sent by the network device; and determining, by the terminal, the one or more carriers from the carriers as to-be-measured carriers based on priorities of the one or more carriers exceeding a threshold.

4. The method according to claim 1, wherein the paging message carries information instructing the terminal to start to measure the one or more carriers.

5. The method according to claim 1, further comprising:
receiving, by the terminal, configuration information from the network device, wherein the configuration information configures a secondary cell, and the one or more carriers comprise a carrier corresponding to the secondary cell.

6. A communication method, comprising:
measuring, by a terminal in an idle state, one or more carriers; and
sending, by the terminal on an uplink resource, a measurement result of measuring the one or more carriers to a network device, wherein measuring the one or more carriers is performed in any one of following manners:
measuring, by the terminal, the one or more carriers based on a second measurement duration determined based on a first measurement duration and a speed of the terminal, or based on the second measurement duration determined based on the first measurement duration and a height of the terminal; or
measuring, by the terminal, the one or more carriers to obtain a first measurement value at a first time, and when a distance between a current location of the terminal and a location at which the terminal has performed measurement of the one or more carriers at the first time is greater than a second threshold, re-measuring, by the terminal, the one or more carriers at a second time after the first time to obtain a second measurement value as the measurement result to be sent to the network device; and
wherein the method further comprises:
determining, by the terminal, a first adjustment factor based on the height of the terminal, and determining, by the terminal, the second measurement duration based on the first adjustment factor and the first measurement duration; or
determining, by the terminal a second adjustment factor based on the speed of the terminal, and determining, by the terminal, the second measurement duration based on the second adjustment factor and the first measurement duration.

7. The method according to claim 6, further comprising:
receiving, by the terminal, priorities of the carriers that are sent by the network device; and
determining, by the terminal based on the priorities of the carriers, the one or more carriers as to-be-measured carriers.

8. The method according to claim 6, further comprising:
receiving, by the terminal, configuration information from the network device, wherein the configuration information configures a secondary cell, and the one or more carriers comprise a carrier corresponding to the secondary cell.

9. An apparatus comprising:
a non-transitory memory storage comprising instructions; and
one or more processors in communication with the memory storage, wherein the instructions, when executed by the one or more processors, cause the apparatus to perform:
initiating, with the apparatus in an idle state, measurement on one or more carriers when an amount of to-be-sent data exceeds a first threshold, or initiate the measurement on the one or more carriers in response to the apparatus receiving a paging message that pages the apparatus for receiving a downlink signal and that instructs the apparatus to initiate the measurement on the one or more carriers; and
sending, on an uplink resource, a measurement result of the measurement on the one or more carriers to a network device; and
wherein the instructions, when executed by the one or more processors, cause the apparatus further to perform:
measuring the one or more carriers based on a first measurement duration; or
measuring the one or more carriers based on a second measurement duration determined based on a speed or a height of the apparatus; or
measuring the one or more carriers in a periodic measurement manner; or
measuring the one or more carriers to obtain a first measurement value, and when a distance between a current location of the apparatus and a location at which the apparatus performs the measurement is greater than a second threshold, measure the one or more carriers to obtain a second measurement value, wherein the second measurement value is used as the measurement result; and
wherein measuring the one or more carriers in the periodic measurement manner comprises:
measuring the one or more carriers in the periodic measurement manner based on at least two of a cycle duration, a measurement time length, and an interval time length.

10. The apparatus according to claim 9, wherein the instructions, when executed by the one or more processors, cause the apparatus further to perform:
determining a first adjustment factor based on the height of the apparatus, and determining the second measurement duration based on the first adjustment factor and the first measurement duration; or
determining a second adjustment factor based on the speed of the apparatus, and determining the second measurement duration based on the second adjustment factor and the first measurement duration.

11. The apparatus according to claim 9, wherein the instructions, when executed by the one or more processors, cause the apparatus further to perform:
receiving priorities of carriers that are sent by the network device; and
determining the one or more carriers from the carriers as to-be-measured carriers based on priorities of the one or more carriers exceeding a threshold.

12. The apparatus according to claim 9, wherein the paging message carries information instructing the apparatus to start to measure the one or more carriers.

13. The apparatus according to claim 9, wherein the instructions, when executed by the one or more processors, cause the apparatus further to perform:
receiving configuration information from the network device, wherein the configuration information configures a secondary cell, and the one or more carriers comprise a carrier corresponding to the secondary cell.

14. The method according to claim 6, further comprising:
receiving, by the terminal, a paging message that carries information instructing the terminal to start to measure the one or more carriers.

15. The method according to claim 6, wherein the one or more carriers are measured in a periodical measurement manner.

\* \* \* \* \*